United States Patent [19]

Basile et al.

[11] 4,372,048
[45] Feb. 8, 1983

[54] OPTICAL FIBER CLEAVER WITH PULLER

[75] Inventors: Rocco F. Basile, Roselle; Kenneth P. Blum, Colonia, both of N.J.; John M. Cole, New Hope, Pa.

[73] Assignee: Thomas & Betts Corporation, Raritan, N.J.

[21] Appl. No.: 111,845

[22] Filed: Jan. 14, 1980

[51] Int. Cl.³ .......................... A21C 5/08; B25F 3/00
[52] U.S. Cl. ...................................... 30/124; 30/90.3; 30/91.2; 30/164.9
[58] Field of Search ................ 30/114, 90.3, 91.2, 30/90.8, 91.1, 124, 164.9, 188, 128; 81/9.51, 9.5 R, 9.5 A

[56] References Cited

U.S. PATENT DOCUMENTS

| | | | |
|---|---|---|---|
| 967,635 | 8/1910 | Hewitt | 30/90.3 |
| 967,636 | 8/1910 | Hewitt | 30/90.3 |
| 2,285,167 | 6/1942 | Montgomery | 81/9.51 |
| 2,317,944 | 4/1943 | Schaefer | 30/90.3 |
| 2,683,930 | 7/1954 | Walters | 30/91.2 |
| 2,735,175 | 2/1956 | Tallman | 30/91.2 |
| 3,688,404 | 9/1972 | Muller | 30/91.2 |
| 3,851,387 | 12/1974 | Ducret | 30/90.3 |
| 3,959,877 | 6/1976 | Zorzenon | 30/90.3 |
| 4,051,749 | 10/1977 | Bell et al. | 81/9.51 |
| 4,063,343 | 12/1977 | Reymond et al. | 81/9.51 |
| 4,188,702 | 2/1980 | Herbert | 81/9.51 |
| 4,202,475 | 5/1980 | Hirai et al. | 225/2 |

FOREIGN PATENT DOCUMENTS

| | | | |
|---|---|---|---|
| 77583 | 6/1933 | Sweden | 81/9.5 A |
| 199712 | 11/1965 | Sweden | 81/9.51 |

*Primary Examiner*—Jimmy C. Peters
*Assistant Examiner*—J. T. Zatarga
*Attorney, Agent, or Firm*—Robert M. Rodrick; Salvatore J. Abbruzzese; Jesse Woldman

[57] ABSTRACT

A hand-held fiber cleaving tool has an elongate channel for receiving a fiber, a shroud for exposing a part of the fiber and a fiber cleaving unit including a cutting element rotative through the shroud about an axis parallel to and spaced from the channel longitudinal axis for generally sectoral cutting of the fiber. The tool further includes a fiber puller cooperating with a fiber clamping device to separate a portion of the fiber subsequent to cleaving. The clamping device is disposed on one side of the cleaved fiber portion and the fiber puller is disposed on the opposite side. The puller has selectively movable members adapted to grasp the fiber under manual operation and to pull the grasped portion in a longitudinal direction to separate it from the fiber portion held by the clamping device.

12 Claims, 6 Drawing Figures

OPTICAL FIBER CLEAVER WITH PULLER

FIELD OF THE INVENTION

This invention relates to optical fibers and pertains more particularly to apparatus for cleaving optical fibers in preparation of same for optical interfacing with other fibers.

BACKGROUND OF THE INVENTION

In interfacing optical fibers with one another in splices and connectors, it is essential to provide that each of the optical fibers to be coupled have end surfaces perpendicular to the longitudinal axis of the fiber with nominal variation. Additionally, the fiber end surface is ideally mirror smooth.

Convenient apparatus for so cleaving fibers is set forth in U.S. Pat. Nos. 4,262,417 issued to Logan et al on Apr. 21, 1981 and 4,249,305 issued to Basile on Feb. 10, 1981, both patents being commonly assigned with the present application. In each of these referenced patent applications, an elongate stem defines a longitudinal channel for supporting a fiber and further supports a cutting element mounted for rotation about the longitudinal axis of the channel and movable into interference path with the fiber throughout a complete revolution. In each instance, the cutting element is provided in offset relation to the channel such that the fiber may be initially disposed in the channel and thereafter, upon movement of the cutting element radially with respect to the fiber into engagement therewith, the cutting element is rotated to provide a continuous peripheral groove in the fiber. On completion of the grooving operation, the cutting element is withdrawn from interference with the fiber and a longitudinal pulling action on the fiber provides for a properly cleaved fiber end suitable for interfacing with a similarly cleaved fiber.

The movement of the cutting element in the apparatus of each of the referenced patent applications radially of the fiber and into engagement therewith gives rise to two operational characteristics which lessen the effectiveness of devices so constructed. Firstly, the devices require, prior to fiber insertion in the channel, operator movement of the cutting element radially outward relative to the channel against biasing means normally serving to maintain the cutting element resident in the channel. Secondly, since the cutting element is thrust into the fiber following fiber insertion in the channel and operator release of the cutting element and is rotated a full revolution in radially-biased engagement with the fiber for each cleaving, cutting element wear is pronounced and replacement is more frequent than desired.

SUMMARY OF THE INVENTION

It is an object of the present invention to provide cleaving devices generally of the aforementioned type but with improved performance capability.

It is a more particular object of the invention to provide cleaving devices of the above-discussed type wherein extended cutting device lifetime may be expected.

In the attainment of the foregoing and other objects, apparatus is provided herein for cleaving an optical fiber wherein an elongate stem defines a longitudinal channel extending therethrough for supporting a fiber and wherein fiber cleaving means is supported by the stem for rotation about an axis offset from and parallel to the channel axis whereby a cutting element is moved selectively into interference with the channel in the course of cleaving means rotation. The cleaving means provides ready disposition of the cutting element outside the channel upon simple rotation thereof, thus simplifying the apparatus of the referenced patent applications by omission of structure requisite to provide for the described radial motion relatively between the channel and the cutting element. The disclosure herein looks further to cutting element movement without biased radial thrust upon the fiber disposed in the channel. In accommodating fiber pulling, apparatus of the disclosure incorporates structure for selective engagement of the fiber and for insuring a direct longitudinal constraint on fiber pulling, thus enhancing the exactness of the fiber end upon completion of cleaving activity.

The foregoing and other objects and features of the disclosure will be further understood from the following detailed description of preferred embodiments thereof and from the drawings wherein like reference numerals identify like parts throughout.

DESCRIPTION OF PREFERRED EMBODIMENTS

Figure 1:
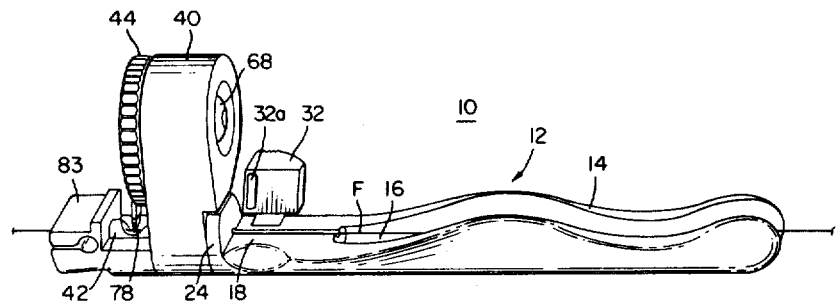
FIG. 1 is a perspective illustration of the preferred embodiment of the cleaving tool of the disclosure.
Figure 2:
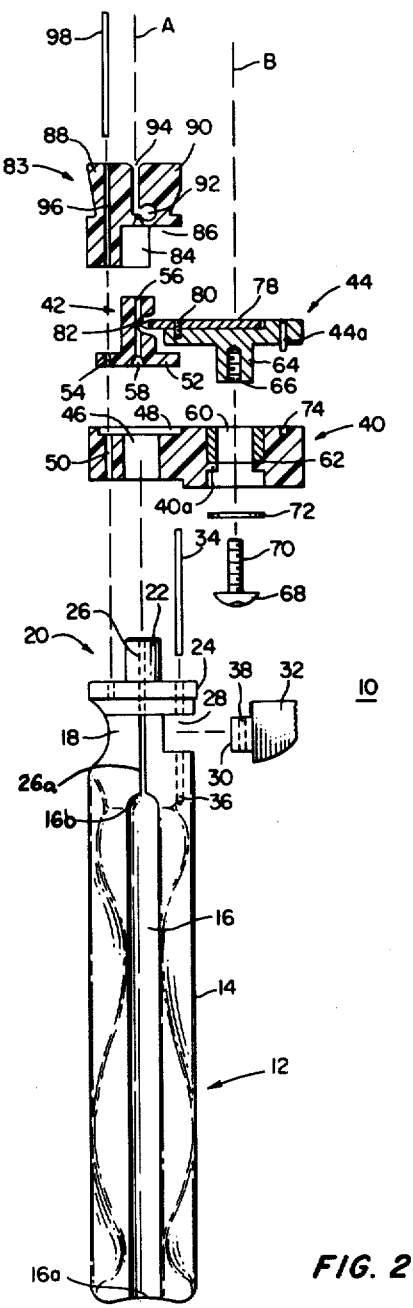
FIG. 2 is an exploded front elevation of the components of the FIG. 1 tool, in part sectioned to illustrate detail, and with the handle rotated ninety degrees relative to other tool parts for convenience of illustration.

Referring to FIGS. 1 and 2, tool 10 includes an elongate stem or handle 12 having a body portion 14 defining a central longitudinal channel 16, generally open along its length extending to end 16a and terminating into a substantially flat surface area defined as land 18 at opposite end 16b of the channel. Head portion 20 of handle 12 includes a cylindrical stub 22 and cylindrical support member 24. A guide tube 26 extends from the upper surface of stub 22 through support 24 in registry with the longitudinal axis of handle 12. A portion of the guide tube 26 is formed to extend as a generally open channel 26a along the land 18 and in communication with channel 16 as at end 16b. The handle is suitably contoured, as shown in FIG. 1, to be conveniently hand held.

An optical fiber F (FIG. 1) to be cleaved is placed in channel 16, passed across land 18 and run into and beyond guide tube 26. Handle 12 has an open portion 28 adapted to receive pivotal support flange 30 of clamp 32. On seating of flange 30 in opening 28, pin 34 is introduced in longitudinal slot 36 of handle 12 and through slot 38 of clamp flange 30, thereby retaining the clamp 32 as part of handle 12 and permitting pivotal movement of clamp 32 onto land 18 to capture the optical fiber situated in the handle. Pad 32a is secured in place on clamp 32 to engage the fiber, i.e., to move into guide channel 26a and longitudinally capture the fiber.

Transition plate 40 serves to couple handle 12 to both fiber shroud 42 and cutting assembly 44. As is shown particularly in FIGS. 2 and 6, plate 40 has an axial bore 46, dimensioned in length and diameter to circumscribe stub 22 of handle 12, bore 46 communicating with plate seat 48. Leftwardly of bore 46 in FIG. 2 and also communicating with seat 48 is slot 50. Fiber shroud 42 has a lower enlarged portion 52 of circular dimension adapted for interfitting with seat 48 of plate 40. On such seating of shroud 42 in plate 40, slot 54 of shroud 42 registers with slot 50 of plate 40. Also, on such seating of shroud 42, fiber guide passage tube 56 extending through shroud 42 and terminating in tapered lower portion 58 is disposed in registry with guide tube 26 of handle stub 22. Guide tube 56 is preferably circular in cross-section transversely of tool axis A, namely, the longitudinal axis of handle 12.

Figure 6:
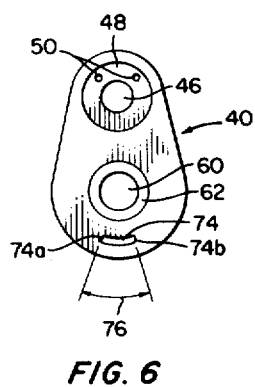

Rightwardly of bore 46 in FIG. 2, plate 40 defines bore 60, which provides seating for bearing 62. Bearing stem 64 of cutting assembly 44 is interiorly threaded at 66 and is dimensioned to reside in seat 62, screw 68 being insertable through plate bore 60 and having threaded portion 70 cooperative with interiorly threaded portion 66 to secure cutting assembly 44 to plate 40. Washer 72 is forced against surface 40a to capture bearing stem 64. Assembly 44 has a dependent lug 44a adapted to seat in rotation-limiting surface slot 74 of plate 40, FIG. 6 showing that slot 74 extends only over acute angle 76 in the upper surface of plate 40 adjacent seat 62. Cutting assembly 44 further includes cutting element 78, disposed in a radially extending passage in assembly 44 and secured therein by pin 80.

Plate 40, shroud 42 and assembly 44 are dimensioned and configured so as to provide for registry of cutting element 78 and transverse opening 82 of shroud 42 along the longitudinal axis A of tool 10. The extent of entry of cutting element 78 into interference path with guide tube 56 of shroud 42 is selected such that a fiber disposed in guide tube 56 is superficially nicked in the course of rotation of cutting assembly 44 through angle 76, i.e., lug 44a and slot 74 together define a normal position for cutting element 78 in noninterfering relation with guide tube 56 upon engagement of lug 44a with slot end surface 74a and a cleaving position for the cutting element upon engagement of lug 44a with end surface 74b of slot 74. As will be seen, in the cutting element normal position, a fiber may be freely inserted throughout handle 12 and shroud 42 without the requirement of operator biasing of the cutting element free of the fiber insertion path. Thus, one simply manually rotates cutting assembly 44 into its normal position out of interference with the fiber path and the cutting operation may commence on seating of the fiber in the tool by manually rotating the cutting assembly 44 toward the cleaving position. In the course of the cleaving operation, cutting element 78 engages the fiber without radial bias through springs or like means in the tools of the referenced patent applications and, based on the offset of tool axis A and cutting assembly axis B, a generally sectoral interference path extending over a quite limited portion of the periphery of the fiber is established. It is observed that these two characteristics of the tool herein give rise to vastly extended lifetime of cutting element 78 over that attainable in the tools of the referenced patent applications while, at the same time, providing adequate fiber end face definition upon pulling subsequent to nicking.

Longitudinally controlled pulling action is achieved in the tool thus far discussed by inclusion of fiber puller 83, shown in section in FIG. 2 to comprise a body defining lower opening 84 adapted to receive and partially circumscribe fiber shroud 42 and sideward recess 86, adapted to expose shroud opening 82 when fiber puller 83 is joined with shroud 42. Puller 83 has first and second members movable relative to one another transversely of tool axis A for fiber engagement and jointly movable along the tool axis. Thus, puller 83 preferably is comprised of an upstanding portion 88, to which is hinged a further portion 90, the hinge being formed by formation of passage 92 through portion 90 and arrangement of slit 94 as shown in FIG. 2, extending along axis A and in registry with guide tube 56 of shroud 42. A longitudinal slot 96 extends through body portion 88 in registry with slots 54 and 50 of shroud 42 and plate 40, respectively, and pulling guide pin 98 extends through slots 96, 54 and 50 into a further slot formed in handle 12. Upon completion of fiber nicking by cutting assembly 44, portions 88 and 90 of puller 83 are pinched together to engage the nicked fiber and puller 83 is displaced upwardly (FIG. 2) along guide pin 98. Translational movement of the fiber portion extending from the nicked portion through the handle is precluded by clamp 32 which may be manually held to capture the fiber in the guide channel 26a. Cleaving action is thereby completed and the fiber may be withdrawn by movement thereof outwardly of handle 12 through opening 16a.

Fiber puller 83 provides an additional tool feature jointly with lug 44a and rotation limiting slot 74, namely, protection of cutting element 78. Thus, the continuation of puller body portion 90 above recess 86 and the limiting of cutter element rotation through only angle 76 insures that the cutter element will be interior of protective tool structure at all times and will not be damaged on tool mishandling, e.g., dropping thereof.

Figure 3:
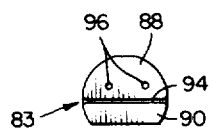
FIGS. 3–6 are top plan elevations of various elements of the FIG. 1 tool, taken individually, and modified in part.
Figure 4:
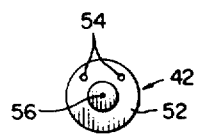
Figure 5:
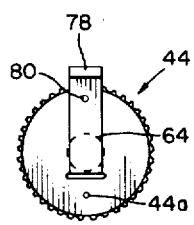

As is best seen in the plan views of parts 83, 42 and 40 in FIGS. 3, 4 and 6, respectively, passages 96, 54 and 50 preferably are each provided in pairs, such that a pair of puller guide pins 98 are circumscribed by puller 83 and available in the tool. For convenience of illustration, FIG. 2 illustrates an embodiment wherein a single pin 98 is provided and passages 96, 54 and 50 are each single passages disposed along an axis parallel to the tool longitudinal (fiber) axis A. The showings of FIGS. 3, 4 and 6 are thus of parts modified from those of FIG. 2 and preferred thereover. Also for convenience of illustration, the tool handle 12 is rotated in FIG. 2 ninety degrees counterclockwise from its actual FIG. 1 position relative to parts 40, 44 and 83 such that additional handle detail may be seen.

Tool parts are preferably comprised of plastic, except for cutting assembly 44 and assembling pins which are desirably metal. The illustrated cutting element will be seen to include a flat metal plate, through which pin 80 extends, and to which is secured a tapered and polished diamond. Other cutting materials for use in cleaving include, for example, jewel materials, molded ceramics, diamond dust-coated wire filaments or discs, etc.

In a particularly preferred embodiment, guide pin or pins 98 are staked over or otherwise deformed at their outward ends after the tool is assembled whereby the pins serve the further function of retaining fiber puller 83 with the tool at all times thereafter. The cutting element is thereby fully shrouded at all times against accidental damage should the tool be mishandled. In such embodiment, fiber puller 83 is afforded only limited movement along pin 98 sufficient to complete cleaving. In a further embodiment, a longitudinal recess may be formed in the flat outer surface of body portion 88 of puller 83 shown at the twelve o'clock position in FIG. 3. A leaf spring may then be secured to transition plate 40 in longitudinal registry with such recess and a flange of the leaf spring seated in the recess for limiting displacement of the puller along the tool longitudinal axis.

As an alternative to the above-described formation of guide passage 56 integrally in fiber shroud 42, the passage may be defined by a metal insert disposed in shroud 42 for convenience in manufacture. Such metal insert may define a square or rectangular passage seated in the periphery of the shroud and opening in registry with opening 82 (FIG. 2). With the dimensions of the passage thereby closely tied to fiber dimension, fiber position may be more closely held during cutting thereof.

Referring again to FIG. 2, handle 12 is readily separable from the remaining parts of the tool, being in simple interference fit therewith through stub 22. Thus, different handles may be substituted as desired to accommodate various fiber/cable structures.

While the foregoing cleaving tool has been described by way of the foregoing particular embodiment, various changes can evidently be made without departing from the invention. For example, in terminating a fiber with a connector, it is contemplated that an appropriately configured substitute handle may hold a connector plug therein. The fiber to be cleaved and terminated is then threaded through the connector plug and then into the tool cleaving area and puller. On cleaving the fiber, the fiber would then be drawn back into the plug, preferably with a retractable plug tip exposing the fiber for cleaving and then moving forward to protect the cleaved fiber end face. It is also within the purview of the invention to provide that the handle stub defining guide tube 26 may be openable such that the cleaved fiber may be separated directly from the handle in the application environment. The particularly disclosed embodiments are accordingly intended for illustrative purposes and not in a limiting sense. The true spirit and scope of the invention is set forth in the following claims.

We claim:

1. Optical fiber cleaving apparatus comprising:
   fiber support means for supporting a fiber non-rotatively thereon;
   fiber cleaving means supported by said fiber support means and having a cutting element movable transversely relative to the axis of said fiber, and means limiting such cutting element movement such that only a portion of the periphery of said fiber is intersected upon movement of said cutting element;
   means supported by said support means at one side of said cleaving means for holding said fiber in a fixed longitudinal position; and
   pulling means supported by said support means at the opposite side of said cleaving means for grasping said fiber and pulling said fiber in a longitudinal direction during said holding of said fiber and subsequent to cleaving thereof.

2. The apparatus claimed in claim 1 wherein said pulling means comprises first and second members movable relative to each other and defining an opening therebetween for receipt of said fiber, said first and second members being selectively movable from a normally unclamped position wherein the members provide a clearance path about said fiber to a clamped position wherein said elements are adapted to engage said fiber in a grasping relation.

3. The apparatus claimed in claim 1 wherein the cutting element is supported for rotational movement about an axis of rotation disposed parallel to and spaced from the axis of said fiber and wherein said cutting element axis is fixed non-rotatively relative to said fiber axis such that the movement of said cutting element defines a sectoral interference path relative to said fiber.

4. Optical fiber cleaving apparatus comprising:
   fiber support means having an elongate channel for supporting a fiber and including fiber shroud means having a fiber guide passage in longitudinal registry with said channel, said shroud means defining an opening in communication with said fiber guide passage, said shroud means being fixed in non-rotative disposition relative to said channel longitudinal axis;
   fiber cleaving means supported by said fiber support means for rotation about an axis parallel to and spaced from the longitudinal axis of said channel, said cleaving means rotational axis being fixed in non-rotative disposition relative to said channel longitudinal axis, said cleaving means having a cutting element movable from a position exterior said fiber guide passage through said opening in said fiber shroud means and into said fiber guide passage on such rotation;
   means supported by said fiber support means at one side of said cleaving means for retaining a fiber disposed in said channel in a fixed longitudinal position; and
   fiber pulling means supported by said fiber support means at the opposite side of said cleaving means for selective movement along the longitudinal direction of said channel axis and for engagement with said fiber disposed in said channel to pull a portion thereof subsequent to cleaving and during retention of said fiber by said retaining means.

5. The apparatus claimed in claim 4 wherein said fiber support means comprises a handle defining said channel and releasably secured to said fiber cleaving means.

6. The apparatus claimed in claim 4 wherein said fiber support means comprises a handle defining said channel, said handle including a land through which said channel extends, and said fiber retaining means defining clamp means supported by said fiber support means for pivotal movement into engagement with said land and into said channel for longitudinal capture of a fiber during cleaving thereof.

7. The apparatus claimed in claim 4 wherein said fiber guide passage is circular in cross-section transversely of said channel longitudinal axis, the distance between said cleaving means rotational axis and said channel longitudinal axis being such that said cutting element is moved into interference sectorally with said fiber guide passage on said rotation of said fiber cleaving means.

8. The apparatus claimed in claim 4 wherein said fiber cleaving means is supported for rotation limited such that said cutting element is constrained to disposition within the boundaries of said fiber shroud means.

9. The apparatus claimed in claim 4 wherein said fiber pulling means comprises first and second members selectively movable relative to one another transversely of said channel axis for such fiber engagement and jointly movable along said channel axis.

10. The apparatus claimed in claim 9 wherein said fiber support means defines pin means parallel to and spaced from said channel axis and wherein said fiber pulling means is disposed in circumscribing relation to said pin means for movement therealong.

11. The apparatus claimed in claim 4 wherein said fiber pulling means is supported by said fiber support means for limited translational movement along said channel axis.

12. Optical fiber cleaving apparatus, comprising:
an elongate handle having a longitudinal channel therein for supporting a fiber;
fiber shroud means supported by said handle and having fiber guide passage means therethrough in longitudinal registry with said channel, said fiber shroud means defining an opening therein communicating with said fiber guide passage means transversely of such channel longitudinal axis, said fiber shroud means being fixed in non-rotative disposition relative to said channel longitudinal axis;
fiber cleaving means supported for rotation about an axis parallel to and spaced from said channel longitudinal axis, said cleaving means rotational axis being fixed in non-rotative disposition relative to said channel longitudinal axis, said cleaving means having a cutting element movable from a position outside said fiber guide passage means through said fiber shroud means opening and into said fiber guide passage means on such fiber cleaving means rotation; and
fiber pulling means supported by said handle including holding means for holding a portion of a fiber disposed in said channel in a fixed longitudinal position subsequent to cleaving on one side of said cleaved portion, and grasping means for grasping said fiber on the opposite side of said cleaved portion, said grasping means being movable along a longitudinal direction during the holding of said fiber portion to thereby pull said grasped fiber portion and separate it from said held portion.

* * * * *